United States Patent [19]
Karube

[11] Patent Number: 6,046,870
[45] Date of Patent: Apr. 4, 2000

[54] MAGNETIC DISK APPARATUS HAVING NOISE DETECTION

[75] Inventor: Hiro Karube, Toyko, Japan

[73] Assignee: NEC Corporation, Japan

[21] Appl. No.: 08/865,596

[22] Filed: May 29, 1997

[30] Foreign Application Priority Data

May 30, 1996 [JP] Japan ................................. 8-158821

[51] Int. Cl.[7] ............................................... G11B 27/36
[52] U.S. Cl. ............................ 360/31; 360/46; 360/67; 360/68; 360/60
[58] Field of Search ............................... 360/31, 46, 67, 360/68, 60

[56] References Cited

U.S. PATENT DOCUMENTS

| 5,461,517 | 10/1995 | Suda et al. ................................. 360/53 |
| 5,831,781 | 11/1998 | Okamura ..................................... 360/31 |

FOREIGN PATENT DOCUMENTS

| 2297702 | of 1990 | Japan . |
| 4-228103 | 8/1992 | Japan . |
| 5-258205 | 10/1993 | Japan . |
| 5-325110 | 12/1993 | Japan . |
| 8-27888 | 3/1996 | Japan . |

OTHER PUBLICATIONS

Office Action Issued by the Japanese Patent Office on Jan. 16, 1999 for the Corresponding Japanese Application and a Translation Thereof.

*Primary Examiner*—Alan Faber
*Attorney, Agent, or Firm*—Ostrolenk, Faber, Gerb & Soffen, LLP

[57] ABSTRACT

In a magnetic disk apparatus performing a positioning operation in a sector servo system, an AGC amplification gain measuring circuit measures an amplification gain of an AGC amplifier on the basis of the reproduction of a magnetic pattern in an AGC region within a servo area of a magnetic disk. An AGC amplification gain judgment circuit judges whether the value of the amplification gain measured by the AGC amplification gain measuring circuit is out of a set range, and outputs the judgment result. When receiving from the AGC amplification gain judgment circuit a judgment result indicating that the value of the amplification gain is out of the set range, a recording/reproducing operation control circuit stops the recording operation of a recording circuit.

10 Claims, 6 Drawing Sheets

SERVO AREA

MAGNETIC DISK APPARATUS HAVING NOISE DETECTION

BACKGROUND OF THE INVENTION

1. Field of the Invention

The present invention relates to a magnetic disk apparatus having a composite type magnetic head comprising a recording head and a reproducing head, and more particularly to a magnetic disk apparatus in which a magnetic head is positioned in a sector servo system by a reproducing head using a magneto-resistive effect (magneto-resistive effect type reproducing head).

2. Description of Related Art

In general, a composite type magnetic head has high degree of freedom in design because a recording element and a reproducing element thereof are separated from each other. Particularly when a magneto-resistive effect type reproducing head is used to perform a reproducing operation, high reproduction sensitivity can be obtained. Accordingly, a composite type magnetic head having a combination of an inductive head for recording and a magneto-resistive head for reproducing is used in a high-density magnetic disk apparatus.

With respect to the magneto-resistive effect type reproducing head, it is difficult to suppress occurrence of Bark Hausen Noise (hereinafter referred to as "BHN"), and thus it has a disadvantage that distortion of reproduced waveform, variation of reproduced output and/or variation in symmetry of the reproduced waveform occur. In the magneto-resistive effect type reproducing head, the variation of the reproduction output and the variation in symmetry of the reproduced waveform occur due to other causes than BHN. With respect to an abnormal operation phenomenon of a reproducing head, from the viewpoint of "the operational instability of the reproducing head", the abnormal operation due to BHN and the abnormal operation due to the other causes can be identified with each other. Accordingly, in the following description, the abnormal operation which is mainly caused by BHN will be typically described.

Occurrence of BHN varies the value of a position error signal which is required to position a magnetic head, so that the magnetic head is positioned to an incorrect position in a disk radial direction.

The error of the positioning of the magnetic head due to BHN causes the following problems (1) and (2).

(1) If BHN occurs when the magnetic head is positioned during a reproducing operation, a seek error occurs and thus the reproducing operation is impossible. Another problem due to BHN in the reproducing operation than the "position error" problem, is that a phenomenon that a detected error rate is lowered when BHN is superimposed on reproduced data during the reproducing operation of a data area in the magnetic disk. However, these problems are significant only in the reproducing operation, and have no effect on the recording operation itself.

(2) It is required to position the magnetic head to a desired position in the recording operation. Accordingly, even in the recording operation, an operation of decoding a position error signal detected by the reproducing head is necessarily performed. When BHN occurs during the positioning operation of the magnetic head in the recording operation, data is recorded at an erroneous position, resulting in the occurrence of such a critical problem in that the data in the magnetic disk is broken.

In the conventional magnetic disk apparatus, the position error signal required for the positioning is provided with no error correction function. In addition, it is provided with no function of judging whether the position is correct or not. Accordingly, the positioning error as described above can be detected on the basis of only the seek error in the reproducing operation. However, since BHN does not steadily occur, in many cases BHN does not cause a seek error, and only the position error signal indicates an erroneous value.

If BHN causes the seek error, the subsequent recording operation is not performed to avoid the problem in the recording operation (the above (2) problem). However, when no seek error occurs and only the position error signal indicates an erroneous value, data is recorded at an erroneous position, and thus the above problem (2) occurs.

That is, the conventional magnetic disk apparatus (the magnetic disk apparatus having the magneto-resistive effect type reproducing head) has the problem that even when a positioning error occurs due to the variation of the position error signal based on BHN, the erroneous operation (the abnormal operation of the reproducing head) cannot be detected.

In order to avoid the BHN problem in the conventional magnetic disk apparatus, a countermeasure of suppressing the BHN has been considered.

The suppression of the BHN has been performed by a method of controlling the magnetic head. For example, Japanese Laid-open Patent Application No. Hei-5-325110 discloses a method of setting, every magnetic head, a sense current having no BHN produced in the a read amplifier, Japanese Laid-open Patent Application No. Hei-5-258205 discloses a method of applying a bias current to a magneto-resistive head (magneto-resistive effect type reproducing head) when a recording current is applied to an inductive head (inductive type recording head), and Japanese Laid-open Patent Application No. Hei-4-228103 discloses a method of gradually reducing a write-in current in the recording head to reduce BHN in the reproducing operation subsequent to the write-in operation.

These typical techniques have put some technical thought into the suppression of BHN when the magneto-resistive effect type reproducing head is operated.

In addition to the above techniques, there are disclosed many other techniques each of which improves the structure of a magneto-resistive effect type reproducing head or the structure of a composite type magnetic head comprising an inductive type recording head and a magneto-resistive effect type reproducing head to provide a magnetic head having no BHN.

According to the conventional techniques as described above, the level of the suppression of occurrence of BHN can be enhanced. However, it is difficult to perfectly suppress the occurrence of BHN, and when BHN occurs, a malfunction due to BHN (erroneous positioning of magnetic head or the like) cannot be detected. As a conventional countermeasure to the abnormal operation of the magneto-resistive effect type reproducing head due to the other causes than BHN, some improvement has been made on the magnetic head itself, for example by improving the structure of the reproducing head, altering the materials constituting the reproducing head, changing the composition of the materials or the like. Accordingly, no consideration has been taken on "detection of malfunction".

Further, according to an apparatus having an inductive type magnetic reproducing/recording head disclosed in Japanese Post-examined Patent Application No. Hei-8-27888, when a data error is detected during the data reproducing operation from a data area, the recording operation is performed on an area different from the data area concerned, and then the reproducing operation is performed again to enhance effectivity of the reproducing operation. In the composite type magnetic head, the reproducing operation and the recording operation are performed by different elements respectively. On the other hand, in the inductive type magnetic reproducing/recording head, the reproducing operation and the recording operation are performed by the same element. Accordingly, both types of magnetic heads adopt the completely different operating principles for the reproducing operation. Further, there is no disclosure on a technique for moving the magnetic head to another area different from the data area when any error occurs in the data area. This means that the magnetic head itself under trouble must perform the positioning thereof. Therefore, the positioning is not accurately performed, and thus the possibility that the data may be broken is higher. Still further, there is no disclosure of the countermeasure of solving any problem when the problem occurs in the magnetic head during the positioning operation of the magnetic head. Accordingly, in this case, there is a high possibility that the data may be broken.

In the above-described conventional magnetic disk apparatuses, the malfunction due to BHN or the like (erroneous positioning of magnetic head or the like) cannot be detected. Therefore, even when a position error signal indicates an erroneous value due to BHN or the like in the recording operation, the processing is carried out on the assumption that the value is correct, and thus the magnetic head is positioned to an incorrect position. Therefore, the data breakage is surely induced as described in the problem (2).

In the conventional magnetic disk apparatuses, when the reproducing head abnormally works due to BHN or the like in both the reproducing operation and the recording operation, the reproducing head cannot be used continuously. In this case, there is no other way than that of treating the trouble as a failure of the overall magnetic disk apparatus.

SUMMARY OF THE INVENTION

An object of the present invention is to provide a magnetic disk apparatus having the following characteristics (1) and (2).

(1) The operational abnormality of the reproducing head (abnormality of the operation of a magneto-resistive effect type reproducing head on the positioning operation which is caused by variation of a position error signal due to BHN or the like) can be detected, and the reliability of the magnetic disk apparatus having the reproducing head can be enhanced.

(2) When the operational abnormality of the reproducing head is detected as described above, the reproducing head can be normally operated again (the continuous use of the reproducing head is possible).

(1) The following four types of magnetic disk apparatuses are provided on the basis of the difference in the system for detecting the operational abnormality (abnormal operation detecting system) of the reproducing head (magneto-resistive effect type reproducing head).

A magnetic disk apparatus using a first abnormal operation detecting system according to the present invention includes an AGC amplifier gain measuring circuit for measuring an amplification gain of an AGC amplifier on the basis of reproduction of a magnetic pattern in an AGC region in a servo area of a magnetic disk, an AGC amplifier gain judgment circuit for judging whether the value of the amplification gain measured by the AGC amplifier gain measurement circuit is out of a set range, and outputting the judgment result, and a recording/reproducing operation control circuit for stopping a recording operation in a recording circuit when receiving from the AGC amplifier gain judgment circuit a judgment result indicating that the value of the amplification gain is out of the set range.

A magnetic disk apparatus using a second abnormal operation detecting system according to the present invention includes an eccentricity measurement circuit for measuring a disk eccentricity on the basis of a position error signal which is generated in a reproducing operation of a servo area of a magnetic disk, an eccentricity judgment circuit for judging whether the value of the disk eccentricity measured by the eccentricity measuring circuit is out of a set range, and outputting the judgment result, and a recording/reproducing operation control circuit for stopping a recording operation in a recording circuit when receiving from the eccentricity judgment circuit a judgment result indicating that the value of the disk eccentricity is out of the set range.

A magnetic disk apparatus using a third abnormal operation detecting system according to the present invention includes an offset amount measuring circuit for measuring an offset amount of a magnetic head after a head change operation on the basis of a reproduction signal after the head change is performed, an offset amount storage circuit for storing the value of the offset amount measured by the offset amount measuring circuit, an offset variation judgment circuit for calculating an offset variation of the magnetic head after the head change on the basis of both the offset amount of the magnetic head after the head change operation which is measured by the offset amount measurement circuit and the offset amount of the magnetic head before the head change operation which is previously stored in the offset amount storage circuit, judging whether the value of the offset variation is out of a set range, and outputting the judgment result, and a recording/reproducing operation control circuit for stopping the recording operation of a recording circuit when receiving from the offset variation judgment circuit a judgment result indicating that the value of the offset variation is out of the set range.

A magnetic disk apparatus using a fourth abnormal operation detecting system according to the present invention includes a burst-basis output value detection circuit for detecting a signal output value from each burst pattern on the basis of a position error signal which is generated in a reproducing operation of a servo area of a magnetic disk, a burst output value summing circuit for calculating the total value of the respective signal output values detected by the burst-basis output value detection circuit, a burst output total value judgment circuit for judging whether the total value of the respective signal output values calculated by the burst output value summing circuit is out of a set range, and outputting the judgment result, and a recording/reproducing operation control circuit for stopping the recording operation of a recording circuit when receiving from the burst output total value judgement circuit a judgment result indicating that the total value of the respective signal output values is out of the set range.

(2) Further, the following two magnetic disk apparatuses are provided on the basis of the difference in the system for enabling an abnormally-operating reproducing head to operate normally again, so that the reproducing head can be continuously used (i.e., the normal operation restoring system).

A magnetic disk apparatus using a first normal operation restoring system includes a normal restoring circuit by which when it is detected that the value of an amplification gain, the value of a disk eccentricity, the value of an offset variation or the total value of respective signal outputs on a magnetic head is out of a set range, a positioning operation is performed on the basis of a counter magnetic head to the magnetic head concerned so that the magnetic head concerned is moved to a predetermined free-writing area in a disk radial position, and then the magnetic head concerned is controlled to perform the recording operation on the free-writing area, and a retry circuit for performing the positioning operation by the counter magnetic head to move the magnetic head concerned to a disk radial position corresponding to abnormality detection after "the recording operation to restore the normal operation" under the control of the normal restoring circuit is completed, thereby controlling a retry operation of the magnetic head concerned.

A magnetic disk apparatus using a second normal operation restoring system includes a normal restoring circuit by which when it is detected that the value of an amplification gain, the value of a disk eccentricity, the value of an offset variation or the total value of respective signal outputs on a magnetic head is out of a set range, the magnetic head concerned is forcedly moved to a free-writing area existing on the innermost periphery of the disk, and then the magnetic head concerned is controlled to perform the recording operation on the free-writing area, and a retry circuit for moving the magnetic head concerned to a disk radial position corresponding to abnormality detection after "the recording operation to restore the normal operation" under the control of the normal restoring circuit is completed, thereby controlling a retry operation of the magnetic head concerned.

(3) Next, the principle of the magnetic disk apparatus according to the present invention will be described in the following sections (1) to (5) with reference to FIGS. 5 to 7.

(1) Ground of first abnormal operation detecting system

Figure 5:
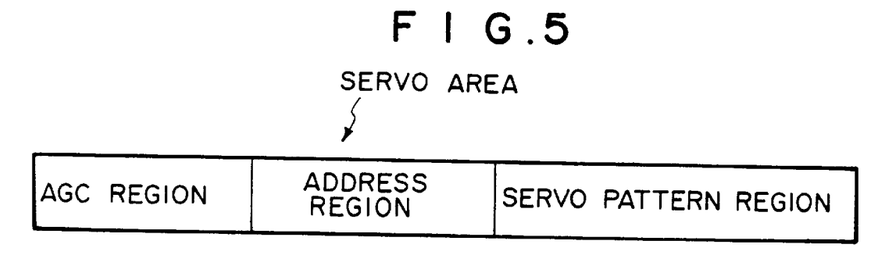
FIG. 5 is a diagram showing a first abnormal operation detecting system (a diagram showing a format of a servo area)

A servo area as shown in FIG. 5 exists at the head of each sector of a magnetic disk. The servo area is formatted to have three regions of an AGC (Automatic Gain Control) region, an address region and a servo pattern region which provides a position error signal.

The AGC region is used to obtain signals which will be input to an automatic gain control circuit of a reproduction amplifier, and it works to keep the amplitude of a reproduction signal constant when the magnetic head is located at any position in a radial direction of the magnetic disk.

The amplification gain of the automatic gain amplifier (AGC amplifier) is defined by the environmental temperature, the position of the head in the disk radial direction, the time variation of the reproducing head, noises, etc., and it varies in accordance with the environmental temperature, etc. However, when the operation of the reproducing head is normal (when no BHN, etc. occurs), this variation is converged into a fixed range.

On the other hand, when the operation of the reproducing head is abnormal due to BHN or the like during the reproduction of the AGC region, the signal amplitude value and signal waveform which are obtained from the AGC region become abnormal. The abnormal signal is directly input to the AGC amplifier, and the amplification gain is adjusted to amplify the input signal so that the output signal is set to have preset signal amplitude.

If the operation of the reproducing head is abnormal, the amplification gain would exceed a normal variation range and set to a large value, for example, if the signal amplitude is small. That is, when the amplification gain exceeds the normal amplification gain and is set to a large value, the operation of the reproducing head is judged to be abnormal.

Accordingly, on the basis of the measurement as to whether the variation of the amplification gain of AGC amplifier is within a set value or not, the operational abnormality of the reproducing head due to BHN or the like can be detected.

(2) Ground of second abnormal operation detecting system

The position error signal indicating the current position of the magnetic head contains information on eccentricity of the magnetic disk which is caused by a spindle motor or the like. When the operation of the reproducing head is abnormal, the value of the position error signal varies finally.

When there occurs such a sudden operational abnormality of the reproducing head as the operational abnormality of the reproducing head due to BHN or the like, the value of the position error signal also varies suddenly. The sudden variation of the value of the position error signal magnifies the apparent disk eccentricity. That is, by measuring the variation range of the disk eccentricity, it is found out that the disk eccentricity stays within a fixed variation range when the operation of the reproduction head is normal, whereas the disk eccentricity is measured to apparently exceed a variation range when the operation of the reproducing head is abnormal.

Accordingly, when the variation of the disk eccentricity is measured to exceed a predetermined range, the operation of the reproducing head is judged to be abnormal, and thus the operation abnormality of the reproducing head due to BHN or the like can be detected.

(3) Ground of third abnormal operation detecting system

Figure 6:
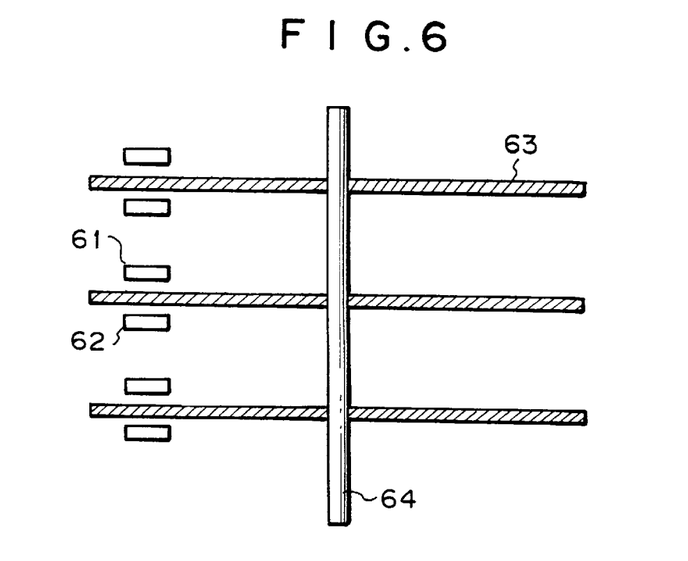
FIG. 6 is a diagram showing a third abnormal operation detecting system (diagram showing the relative positional relationship between a magnetic disk and a magnetic head in a magnetic disk apparatus.

As shown in FIG. 6, the magnetic disk apparatus records data on both sides of the magnetic disk, and thus it uses two or more magnetic heads. Actually, a magnetic head for performing the recording operation or the reproducing operation is sequentially changed to another magnetic head, and thus there is no possibility that these plural magnetic heads perform the respective operations at the same time. Ordinarily, the magnetic head is changed to another and then used. This changing operation of the magnetic head is referred to as "head change".

In general, just after the head change is made from a first magnetic head (for example, a magnetic head 61 in FIG. 6) to a second magnetic head (for example, a magnetic head 62 in FIG. 6), the magnetic head 61 is positioned at a place on a track, and the relative position between the track and the magnetic head 61 is fixed. However, the relative position between the magnetic head 62 and the track just after the head change is not identical to the relative position between the magnetic head 61 and the track. This is caused by the difference in magnetic properties between the magnetic head 61 and the magnetic head 62, the offset due to mechanical error, the offset due to heat, etc.

Once the offset due to the difference in magnetic properties between the magnetic heads or the mechanical error is measured, it is little varied subsequently. Further, the offset due to heat can be removed by measuring and memorizing the total offset amount of the magnetic heads every time the head change is performed, and thus the amount of the offset due to heat can be regarded as a variation of the offset.

However, when the operation of the reproducing head is abnormal, the magnetic properties of the reproducing head vary, and thus the offset variation amount of the magnetic head after the head change exceeds a preset value.

Accordingly, when the offset variation amount of the magnetic head after the head change is out of a set value, the operation of the reproducing head of the magnetic head after the head change can be judged to be abnormal. Therefore, the operational abnormality of the reproducing head which is caused by BHN or the like can be detected.

(4) Ground of fourth abnormal operation detecting system

Figure 7:
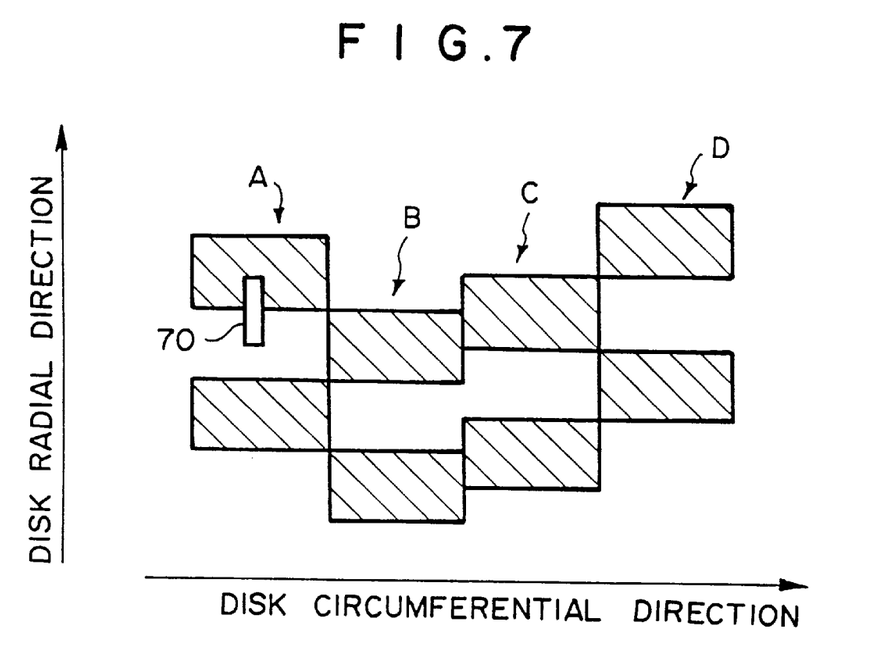
FIG. 7 is a diagram showing a fourth abnormal operation detecting system (a diagram showing the relative positional relationship in a disk radial direction of portions of a burst pattern).

As shown in FIG. 7, a servo pattern which is called as a "burst pattern" to obtain the position error signal ordinarily comprises four portions. The four portions are arranged while displaced from one another in the disk radial direction.

The position error signal is obtained by subtracting the signal output value of the burst pattern A from the signal output value of the burst pattern B, or it can be obtained by subtracting the signal output value of the burst pattern C from the signal output value of the burst pattern D. That is, totally, two position error signals (of two phases) can be obtained.

These burst patterns are periodically arranged with no gap in the disk radial direction. Accordingly, the signal can be reproduced from each burst pattern irrespective to the position where the magnetic head 70 of FIG. 7 is located in the disk radial direction, and the total value of the signal output values from the respective burst patterns is constant.

The total value of the signal output values from the respective burst patterns is varied within a fixed range due to noises or the like. The total value is not out of this fixed range insofar as the reproducing head normally operates. However, when the reproducing head works abnormally, the total value of the signal output values from the respective burst patterns is out of this fixed range.

Accordingly, when the total value of the signal output values from the respective burst patterns is out of the range, the reproducing head is judged to work abnormally, and thus the operational abnormality of the reproducing head due to BHN or the like can be detected.

(5) Normal operation restoring system

There are a large number of factors which cause the abnormal operation of the reproducing head, and thus it is very difficult to specify one of the factors. However, as a result of repetitive experiments and studies of the inventor of this application, it has been found out by the inventor that when a reproducing head of a composite type magnetic head (which comprises both a reproducing head and a recording head) operates abnormally, if the recording operation is performed by the recording head of the magnetic head having the abnormally-operating reproducing head, the abnormally-operating reproducing head can be restored to operate normally. The reason why the abnormally-operating reproducing head is restored may reside in that when the magnetic field which is generated during the recording operation of the recording head is applied to the abnormally-operating reproducing head, the magnetization of the reproducing head is initialized, and the initialization of the magnetization can restore the reproducing head to operate normally.

Here, if the recording operation for the restoration of the reproducing head is performed at any disk radial position to restore the abnormal operation of the reproducing head to the normal operation, it would reduce the reliability of the magnetic disk apparatus because the accurate positioning operation cannot be performed during this recording operation. Therefore, this recording operation is a very risky operation.

In the first normal operation restoring system of the magnetic disk according to the present invention, in order to avoid this risk, the disk radial position corresponding to an area in which the recording operation is performed to restore the reproducing head to operate normally (hereinafter referred to as "free-writing area") is predetermined. The magnetic head having the abnormally-operating reproducing head is positioned and moved to the free-writing area by positioning to the free-writing area the counter magnetic head which is disposed at the opposite side to the magnetic head having the abnormally-operating reproducing head with respect to the disk. That is, following the movement of the counter magnetic head, the magnetic head having the abnormally-operating reproducing head is automatically moved to the free-writing area, and then on the free-writing area, the recording head of the magnetic head having the abnormally-operating reproducing head performs the recording operation, and this recording operation makes the abnormally-operation reproducing head restored.

Further, in the second normal operation restoring system of the magnetic disk apparatus of the present invention, the free-writing area is set on the innermost periphery of the disk without performing "the positioning operation by another magnetic head" in the first normal operation restoring system, and the abnormally-operating reproducing head (the magnetic head having the reproducing head concerned) is forcedly moved to the innermost periphery of the disk so that the magnetic head having the reproducing head concerned performs the recording operation on the free-writing area.

During the recording operation to restore the reproducing head to the normal operation, the magnetic head having the abnormally-operating reproducing head is set to be effective. Therefore, even when the driving current of a voice coil motor is set to a constant value, the position of the magnetic head may be fluctuated due to the disk eccentricity or the like. Accordingly, it is preferable that the area for performing the recording operation to restore to the normal operation is set to 2.5 times or more of a track pitch, more preferably 3 times or more of a track pitch.

DETAILED DESCRIPTION OF THE PREFERRED EMBODIMENTS

Preferred modes (embodiments) according to the present invention will be described with reference to the accompanying drawings.

(1) First Mode

Figure 1:
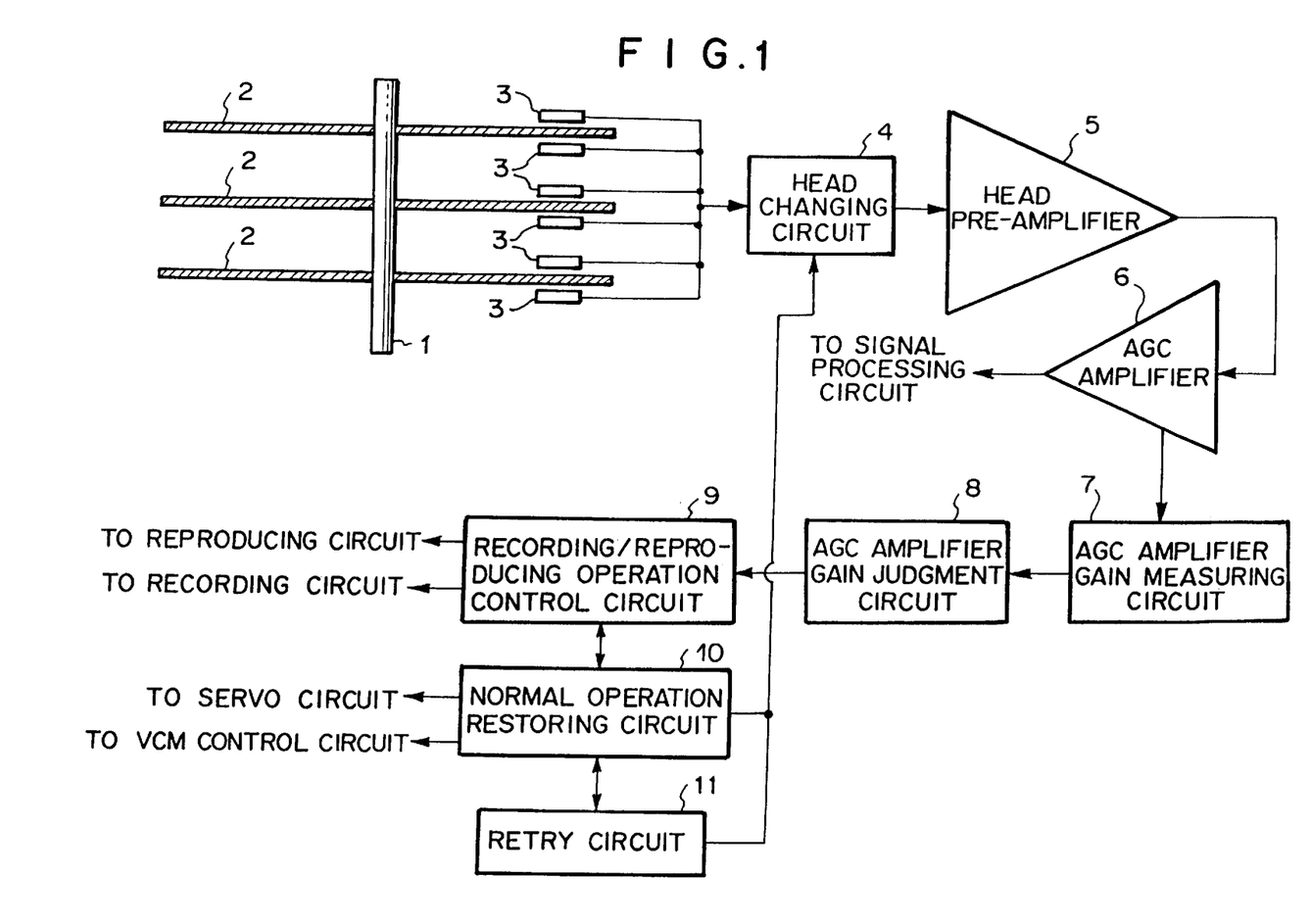
FIG. 1 is a block diagram showing a first embodiment of a magnetic disk apparatus according to the present invention.

FIG. 1 is a block diagram showing a first mode of a magnetic disk apparatus of the present invention.

The magnetic disk apparatus of this mode includes a spindle motor shaft 1, magnetic disks 2, respective pairs of magnetic heads 3 (each pair comprises a magnetic head and a counter magnetic head), a head changing circuit 4, a head pre-amplifier 5, an AGC amplifier 6, an AGC amplification gain measuring circuit 7, an AGC amplification gain judgment circuit 8, a recording/reproducing operation control circuit 9, a normal operation restoring circuit 10 and a retry circuit 11. In the following description, each magnetic head head 3 comprises a reproducing head and a recording head, and a magneto-resistive (MR) head is used as the reproducing head and an inductive head (ID) is used as the recording head.

From the viewpoint of the classification as described above, the magnetic disk apparatus of this mode uses the first abnormal operation detecting system and the first normal operation restoring system.

Next, the operation of the magnetic disk apparatus of this mode will be described.

It is now considered that the reproducing operation is performed on the magnetic disk 2 rotating around the spindle motor shaft 1.

In this case, the reproducing head (magneto-resistive effect type reproducing head) of a magnetic head 3 transmits a reproduced signal through the head changing circuit 4 to the head pre-amplifier 5.

The head pre-amplifier 5 performs the first signal amplification on the reproduced signal.

The AGC amplifier 6 subsequently adjusts and amplifies the reproduced signal on the AGC region (see FIG. 5) in the servo area, amplified by the head pre-amplifier 5, so as to obtain a desired signal output, and then outputs the signal thus amplified to a signal processing circuit.

At this time, the AGC amplification gain measuring circuit 7 measures the amplification gain of the AGC amplifier 6, and the amplification gain measured by the AGC amplification gain measurement circuit 7 is input to the AGC amplification gain judgment circuit 8.

The AGC amplification gain judgment circuit 8 judges whether the value of the amplification gain of the AGC amplifier 6 is out of a predetermined range (preset range), and transmits the judgment result to the recording/reproducing operation control circuit 9. As described above, when the operation of the reproducing head is abnormal due to BHN or the like, the value of the amplification gain of the AGC amplifier 6 is over the predetermined range.

The recording/reproducing operation control circuit 9 transmits to a recording circuit and a reproducing circuit commands for continuing the recording/reproducing operation when he value of the amplification gain of the AGC amplifier 6 is within the predetermined range.

On the other hand, when the value of the amplification gain of the AGC amplifier 6 is out of the predetermined range (when receiving from the AGG amplifier gain judgment circuit 8 a judgment result indicating that the value of the amplification gain of the AGC amplifier 6 is out of the predetermined range), the recording/reproducing operation control circuit 9 transmits a command to the recording circuit to stop the recording operation, and informs the normal operation restoring circuit 10 that the operation of the reproducing head is abnormal.

The normal operation restoring circuit 10 which recognizes the operational abnormality of the reproducing head transmits commands to the servo circuit, the recording circuit, the reproducing circuit and the head changing circuit 4 (the command is supplied to the recording circuit and the reproducing circuit through the recording/reproducing operation control circuit 9), thereby performing the recording operation to restore the abnormally-operating reproducing head to perform the normal operation. That is, a counter magnetic head to the magnetic head 3 having the abnormally-operating reproducing head is positioned to the free-writing area to move the magnetic head concerned to the free-writing area at a predetermined disk radial position so that the recording head of the magnetic head 3 performs the recording operation on the free-writing area.

Further, the normal operation restoring circuit 10 instructs the retry circuit 11 to perform a retry operation after "the recording operation for the normal operation restoration" is completed.

On the basis of the instruction, the retry circuit 11 instructs the servo circuit, the recording circuit, the reproducing circuit and the head changing circuit 4 to perform the retry operation (the command is transmitted to the servo circuit through the normal operation restoring circuit 10, and transmitted to the recording circuit and the reproducing circuit through the normal operation restoring circuit 10 and the recording/reproducing operation control circuit 9), thereby performing the retry operation of the abnormally-operating reproducing head at the disk radial position corresponding to the abnormality detection. The positioning operation of the magnetic head 3 having the abnormally-operating reproducing head to the disk radial position corresponding to the abnormality detection is performed by the positioning operation of the counter magnetic head as described above.

Further, when "the recording operation for the normal operation restoration" is performed, the magnetic head 3 having the reproducing head concerned (the reproducing head constituting a magnetic head which is forced to perform the recording operation) is forcedly positioned to the free-writing area existing on the innermost periphery of the disk by using no magnetic head 3. In this case, the normal operation restoring circuit 10 performs such a control operation that the command is directly transmitted to a VCM (Voice Coil Motor) control circuit in place of the transmission of the command (for performing the recording operation for the normal operation restoration) to the servo circuit. From the viewpoint of the classification described above, this magnetic disk apparatus corresponds to the mode using the first abnormal operation detecting system and the second normal operation restoring system.

(2) Second Mode

Figure 2:
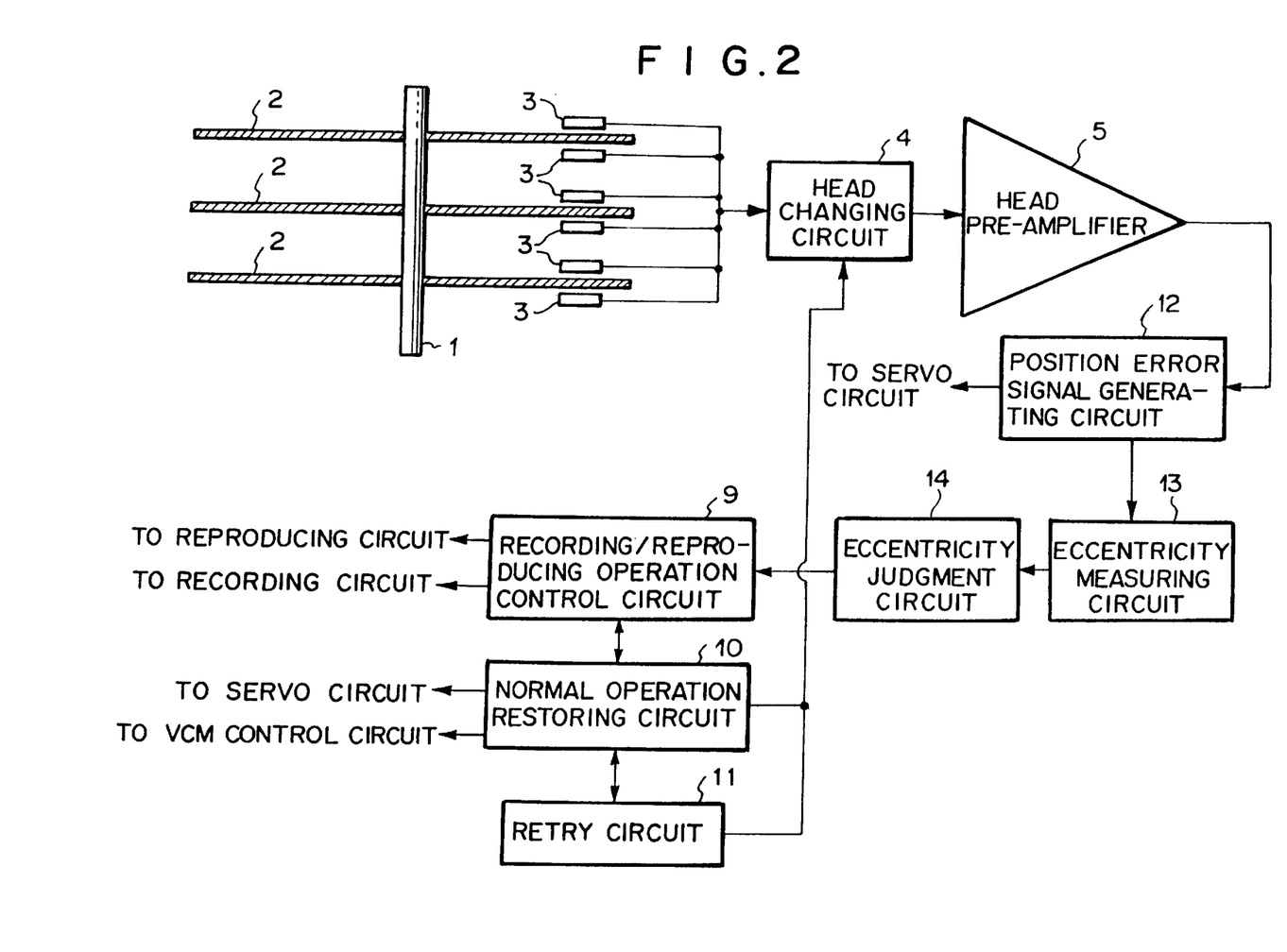
FIG. 2 is a block diagram showing a second embodiment of a magnetic disk apparatus according to the present invention.

FIG. 2 is a block diagram showing a second mode of a magnetic disk apparatus according to the present invention.

The magnetic disk apparatus of this mode includes a spindle motor shaft 1, a magnetic disk 2, a magnetic head 3, a head changing circuit 4, a head pre-amplifier 5, a recording/reproducing operation control circuit 9, a normal operation restoring circuit 10, a retry circuit 11, a position error signal generating circuit 12, an eccentricity measuring circuit 13 and an eccentricity judgment circuit 14.

From the viewpoint of the classification described above, the magnetic disk apparatus of this mode adopts the second abnormal operation detecting system and the first normal operation restoring system.

Next, the operation of the magnetic disk apparatus of this mode will be described.

There is considered the case where the reproducing operation is performed on the magnetic disk 2 which rotates around the spindle motor shaft 1.

In this case, the reproducing head (magneto-resistive effect type reproducing head) of the magnetic head 3 transmits the reproduced signal through the head changing circuit 4 to the head pre-amplifier 5. The head pre-amplifier 5 performs the first signal amplification on the reproduced signal.

The position error signal generating circuit 12 receives the reproduced signal on the servo pattern portion (see FIG. 5) in the servo area which is amplified by the head pre-amplifier 5, and decodes the reproduced signal to the position error signal. The decoded position error signal is transmitted to the servo circuit and the eccentricity measuring circuit 13.

The eccentricity measuring circuit 13 calculates the value of the disk eccentricity on the basis of the position error signal, and transmits the calculation result to the eccentricity judgment circuit 14.

The eccentricity judgment circuit 14 judges whether the value of the disk eccentricity is out of a prescribed range (predetermined range), and transmits the judgment result of the recording/reproducing operation control circuit 9. As described above, when the operation of the reproducing head is abnormal due to BHN or the like, the value of the disk eccentricity is over the predetermined range.

If the value of the disk eccentricity is within the predetermined range, the recording/reproducing operation control circuit 9 transmits to the recording circuit and the reproducing circuit commands for continuing the recording/reproducing operation.

On the other hand, if the value of the disk eccentricity is out of the predetermined range (when receiving from the eccentricity judgment circuit 14 a judgment result indicating that the value of the disk eccentricity is out of the predetermined range), the recording/reproducing operation control circuit 9 transmits a command to the recording circuit to stop the recording operation, and informs the normal operation restoring circuit 10 that the operation of the reproducing head is abnormal.

The normal operation restoring circuit 10 which recognizes the operational abnormality of the reproducing head transmits commands to the servo circuit, the recording circuit, the reproducing circuit and the head changing circuit 4 (the command is transmitted to the recording circuit and the reproducing circuit through the recording/reproducing operation control circuit 9), thereby performing the recording operation to restore the abnormally-operating reproducing head to the normal operation (the recording operation for the normal operation restoration). That is, the abnormally-operating head is positioned by the counter magnetic head of the magnetic head 3 having the abnormally-operating reproducing head to move the magnetic head concerned to the free-writing area of the predetermined disk radial position so that the magnetic head 3 concerned performs the recording operation on the free-writing area.

Further, the normal operation restoring circuit 10 instructs the retry circuit 11 to perform the retry operation after "the recording operation for the normal operation restoration" is completed.

On the basis of the instruction, the retry circuit 11 instructs the servo circuit, the recording circuit, the reproducing circuit and the head changing circuit 4 to perform the retry operation (the command is transmitted to the servo circuit through the normal operation restoring circuit 10, and transmitted to the recording circuit and the reproducing circuit through the normal operation restoring circuit 10 and the recording/reproducing operation control circuit 9), whereby the retry operation of the abnormally-operating reproducing head at the disk radial position corresponding to the abnormality detection is performed. The positioning operation of the magnetic head 3 having the abnormally-operating reproducing head is performed by the counter magnetic head as described above.

Further, when "the recording operation for the normal operation restoration" is performed, the magnetic head 3 having the reproducing head concerned (the reproducing head constituting a magnetic head which is forced to perform the recording operation) is forcedly positioned to the free-writing area existing on the innermost periphery of the disk by using no magnetic head 3. In this case, the normal operation restoring circuit 10 performs such a control operation that the command is transmitted to a VCM (Voice Coil Motor) control circuit in place of the transmission of the command (for performing the recording operation for the normal operation restoration) to the servo circuit. From the viewpoint of the classification described above, this magnetic disk apparatus corresponds to the mode using the second abnormal operation detecting system and the second normal operation restoring system.

(3) Third Mode

Figure 3:
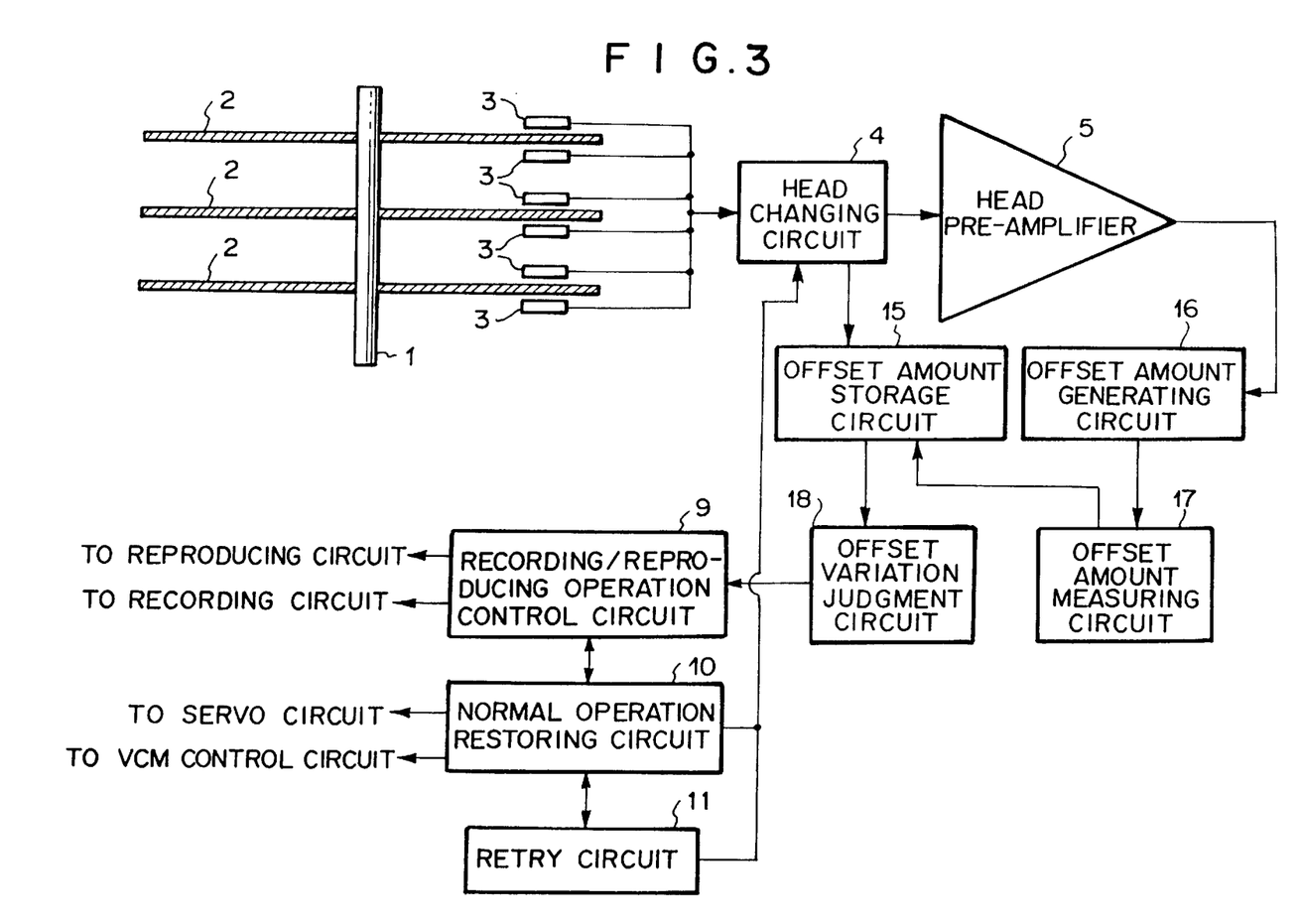
FIG. 3 is a block diagram showing a third embodiment of a magnetic disk apparatus according to the present invention.

FIG. 3 is a block diagram showing a third mode of a magnetic disk apparatus according to the present invention.

The magnetic disk apparatus of this mode includes a spindle motor shaft 1, a magnetic disk 2, a magnetic head 3, a head changing circuit 4, a head pre-amplifier 5, a recording/reproducing operation control circuit 9, a normal operation restoring circuit 10, a retry circuit 11, an offset amount storage circuit 15 (a circuit implemented by a semiconductor memory), an offset amount generating circuit 16, an offset amount measuring circuit 17, and an offset variation judgment circuit 18.

From the viewpoint of the classification described above, the magnetic disk apparatus of this mode adopts the third abnormal operation detecting system and the first normal operation restoring system.

Next, the operation of the magnetic disk apparatus of this mode will be described.

There is considered the case where the reproducing operation is performed on the magnetic disk 2 which rotates around the spindle motor shaft 1.

In this case, the reproducing head (magneto-resistive effect type reproducing head) of the magnetic head 3 transmits the reproduced signal through the head changing circuit 4 to the head pre-amplifier 5. The head pre-amplifier 5 performs the first signal amplification on the reproduced signal.

The offset amount generating circuit 16 is input with the reproduced signal after the head change (the change of the magnetic head 3) is performed, and on the basis of the reproduced signal, it generates the positional offset amount of the magnetic head 3 (the amount indicating the relative position between the magnetic head 3 and the track) after the head change, and then transmits the offset amount thus generated to the offset amount measuring circuit 17.

The offset amount measuring circuit 17 measures the positional offset amount of the magnetic head after the head change, and transmits the measurement result to the offset variation judgment circuit 18 and the offset amount storage circuit 15.

The offset variation judgment circuit 18 calculates the value of the offset variation of the magnetic head after the head change on the basis of "the offset amount of the position of the magnetic head 3 before the head change" stored in the offset amount storage circuit 15 and "the offset amount of the position of the magnetic head 3 after the head change" which is the measurement result of the offset amount measuring circuit 17, judges whether the value of the offset variation is within a prescribed range (predetermined range), and transmits the judgment result to the recording/reproducing operation control circuit 9. As described above, when the operation of the reproducing head is abnormal due to BHN or the like, the value of the offset variation is over the predetermined range.

When the value of the offset variation is within the predetermined range, the recording/reproducing operation control circuit 9 instructs the recording circuit and the reproducing circuit to continue the recording and reproducing operations thereof.

On the other hand, when the value of the offset variation is out of the predetermined range (when receiving from the offset variation judgment circuit 18 a judgment result indicating that the value of the offset variation is out of the predetermined range), the recording/reproducing operation control circuit 9 instructs the recording circuit to stop the recording operation, and informs the normal operation restoring circuit 10 of the operational abnormality of the reproducing head.

The normal operation restoring circuit 10 which recognizes the operational abnormality of the reproducing head transmits commands to the servo circuit, the recording circuit, the reproducing circuit and the head changing circuit 4 (the command is transmitted to the recording circuit and the reproducing circuit through the recording/reproducing operation control circuit 9) to perform the recording operation so that the reproducing operation of the abnormally-operating reproducing head is restored to perform the normal operation. That is, the abnormally-operating reproducing head is positioned by the counter magnetic head of the magnetic head 3 having the abnormally-operating reproducing head to move the magnetic head concerned to the predetermined free-writing area in the disk radial direction so that the magnetic head 3 concerned performs the recording operation on the free-writing area.

Further, the normal operation restoring circuit 10 instructs the retry circuit 11 to perform the retry operation when "the recording operation for the normal operation restoration" is completed.

On the basis of the instruction, the retry circuit 11 transmits to the servo circuit, the recording circuit, the reproducing circuit and the head change circuit commands for performing the retry operation (the command is transmitted to the servo circuit through the normal operation restoring circuit 10, and the commands are transmitted to the recording circuit and the reproducing circuit through the normal operation restoring circuit and the recording/reproducing operation control circuit 9), whereby the abnormally-operating reproducing head performs the retry operation at the disk radial position corresponding to the abnormality detection (at which the abnormality is detected). The positioning operation of the magnetic head 3 having the abnormally-operating reproducing head is performed by the counter magnetic head as described above.

Further, when performing "the recording operation for the normal operation restoration", the magnetic head 3 having the reproducing head concerned (the reproducing head constituting a magnetic head which is forced to perform the recording operation) is forcedly positioned to the free-writing area existing on the innermost periphery of the disk by using no magnetic head 3. In this case, the normal operation restoring circuit 10 performs such a control operation that the command is transmitted to a VCM (Voice Coil Motor) control circuit in place of the transmission of the command (for performing the recording operation for the normal operation restoration) to the servo circuit. From the viewpoint of the classification described above, this magnetic disk apparatus corresponds to the mode which adopts the third abnormal operation detecting system and the second normal operation restoring system.

(4) Fourth Mode

Figure 4:
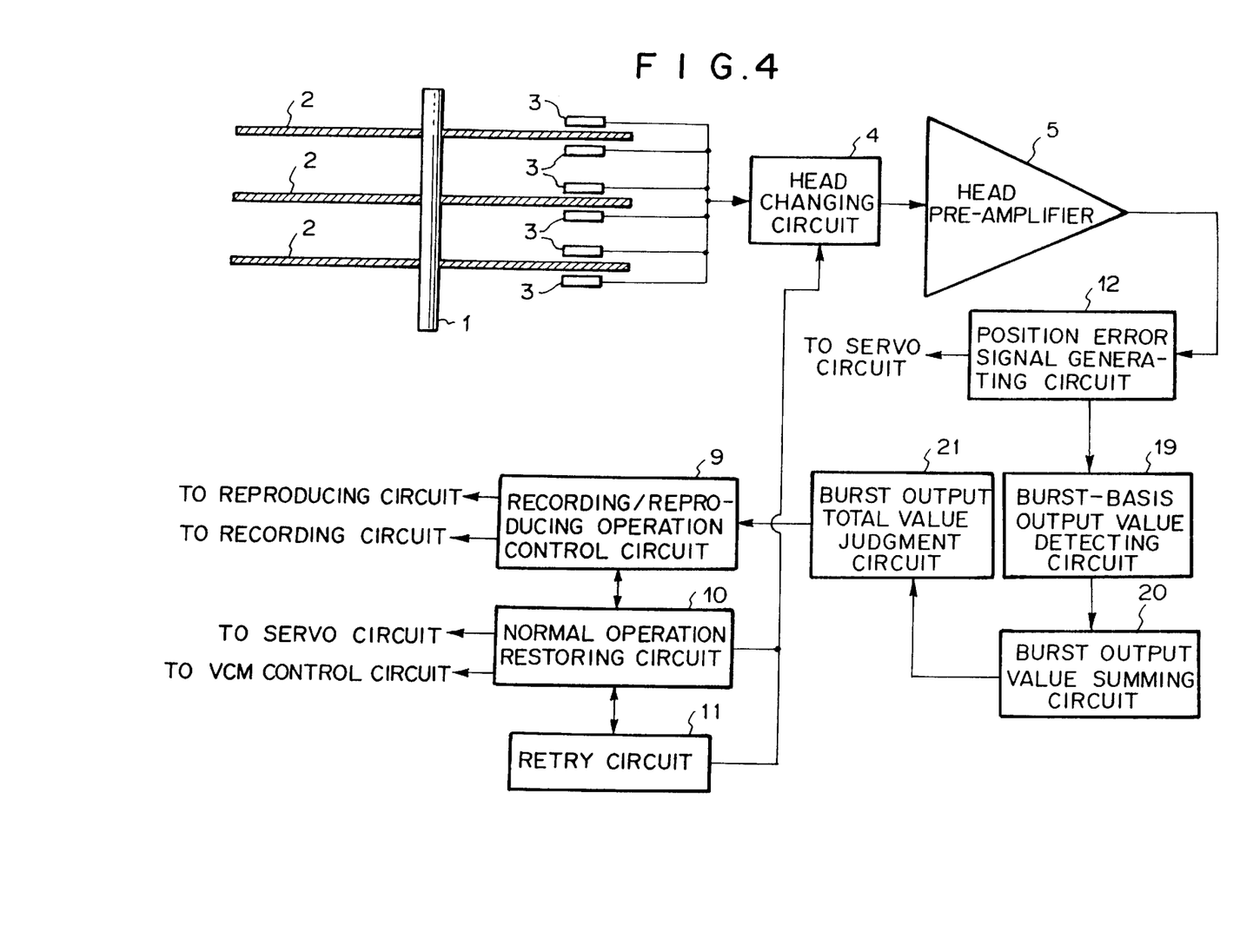
FIG. 4 is a block diagram showing a fourth embodiment of a magnetic disk apparatus according to the present invention.

FIG. 4 is a block diagram showing a fourth embodiment of the magnetic disk apparatus of the present invention.

The magnetic disk apparatus includes a spindle motor shaft 1, a magnetic disk 2, a magnetic head 3, a head changing circuit 4, a head pre-amplifier 5, a recording/reproducing operation control circuit 9, a normal operation restoring circuit 10, a retry circuit 11, a position error signal generating circuit 12, a burst-basis output value detecting circuit 19, a burst output value summing circuit 20 and a burst output total value judgment circuit 21.

This magnetic disk apparatus adopts the fourth abnormality operation detecting system and the first normal operation restoring system as classified above.

Next, the operation of the magnetic disk apparatus of this embodiment will be described.

There is considered the case where the reproducing operation is performed on the magnetic disk 2 which rotates around the spindle motor shaft 1.

In this case, the reproducing head (magneto-resistive effect type reproducing head) of the magnetic head 3 transmits the reproduced signal through the head changing circuit 4 to the head pre-amplifier 5. The head pre-amplifier 5 performs the first signal amplification on the reproduced signal.

The position error signal generating circuit 12 is input with the reproduced signal on the servo pattern portion (see FIG. 5) in the servo area amplified by the head pre-amplifier 5, and decodes the reproduced signal to the position error signal. The decoded position error signal is transmitted to the servo circuit and the burst-basis output value detecting circuit 19.

The burst-basis output value detecting circuit 19 calculates a burst-basis output value (i.e., the output value of each burst) on the basis of the position error signal, and transmits the calculation result to the burst output value summing circuit 20.

The burst output value summing circuit 20 calculates the total value of the output values of the respective bursts, and transmits the calculation result to the burst output total value judgment circuit 21.

The burst output total value judgment circuit 21 judges whether the total value of the output values of the respective bursts is out of a prescribed range (predetermined range), and transmits the judgment result to the recording/reproducing operation control circuit 9. Here, as described above, when the reproducing head operates abnormally due to BHN or the like, the total value of the respective burst output values is over the predetermined range.

When the total value of the respective burst output values is within the predetermined range, the recording/reproducing operation control circuit 9 transmits to the recording circuit and the reproducing circuit a command for continuing the recording and reproducing operations.

On the other hand, when the total value of the respective burst output values is out of the predetermined range, the recording/reproducing operation control circuit 9 instructs the recording circuit to stop the recording operation, and informs the normal operation restoring circuit 10 of the operational abnormality of the reproducing head.

The normal operation restoring circuit 10 which recognizes the operational abnormality of the reproducing head transmits commands to the servo circuit, the recording circuit, the reproducing circuit and the head changing circuit 4 (the command is transmitted to the recording circuit and the reproducing circuit through the recording/reproducing operation control circuit 9) to perform the recording operation so that the reproducing operation of the abnormally-operating reproducing head is restored to perform the normal operation. That is, the abnormally-operating reproducing head is positioned by the counter magnetic head of the magnetic head 3 having the abnormally-operating reproducing head to move the magnetic head concerned to the predetermined free-writing area in the disk radial direction so that the magnetic head 3 concerned performs the recording operation on the free-writing area.

Further, the normal operation restoring circuit 10 instructs the retry circuit 11 to perform the retry operation when "the recording operation for the normal operation restoration" is completed.

On the basis of the instruction, the retry circuit 11 transmits to the servo circuit, the recording circuit, the reproducing circuit and the head change circuit commands for performing the retry operation (the command is transmitted to the servo circuit through the normal operation restoring circuit 10, and the commands are transmitted to the recording circuit and the reproducing circuit through the normal operation restoring circuit and the recording/reproducing operation control circuit 9), whereby the abnormally-operating reproducing head performs the retry operation at the disk radial position corresponding to the abnormality detection (at which the abnormality is detected). The positioning operation of the magnetic head 3 having the abnormally-operating reproducing head is performed by the counter magnetic head as described above.

Further, when performing "the recording operation for the normal operation restoration", the magnetic head 3 having the reproducing head concerned (the reproducing head constituting a magnetic head which is forced to perform the recording operation) is forcedly positioned to the free-writing area existing on the innermost periphery of the disk by using no magnetic head 3. In this case, the normal operation restoring circuit 10 performs a control operation that the command is transmitted to a VCM (Voice Coil Motor) control circuit in place of the transmission of the command (for performing the recording operation for the normal operation restoration) to the servo circuit. From the viewpoint of the classification described above, this magnetic disk apparatus corresponds to the mode using the fourth abnormal operation detecting system and the second normal operation restoring system.

Next, preferred embodiments of the magnetic disk apparatus according to the present invention will be described.

(1) First Embodiment

This embodiment is obtained by embodying the first mode of the present invention (see FIG. 1).

The magnetic disk apparatus of this embodiment operates under the following conditions (1) to (4).

(1) The servo pattern is recorded by using a servo track writer under the following condition: rotation speed of 4500 rpm, recording frequency of 6.67 MHz and recording current of 30 $mA_{o-p}$.

(2) The magnetic head 3 comprises an MR/ID composite head (a composite type magnetic head comprising a magneto-resistive effect type reproducing head and an inductive type recording head) which has a recording track width of 5.8 $\mu$m and a reproducing track width of 4.4 $\mu$m.

(3) The number of sectors per one cylinder of the magnetic disk 2 is equal to 64, and the track pitch is set to 6.35 $\mu$m.

(4) The MR (Magneto-resistive) head which is used as the reproduction head of the magnetic head 3 (MR/ID composite head) in this embodiment is unstable during its reproducing operation, and its output signal is lowered sometimes. When this reproducing head is applied to the conventional magnetic disk apparatus, the value of the position error signal is varied, and thus it is positioned to an incorrect position in the recording operation, resulting in breakdown of the data.

When the first mode of the present invention shown in FIG. 1 is applied to the magnetic disk apparatus having the above conditions, the inventor of this application has confirmed the following operational effects (1) to (4).

(1) By providing the AGC amplification gain measuring circuit 7 and the AGC amplification gain judgment circuit 8, and also the recording/reproducing operation control circuit 9 for stopping the recording operation when the amplification gain of the AGC amplifier 6 is out of a predetermined range, the breakdown of the data can be prevented.

(2) The amplification gain of the AGC amplifier 6 is obtained by measuring feed-back voltage. The feed-back voltage is within a range of 2.5 mV to 15.9 mV when the reproducing head operates normally. Therefore, when the feed-back voltage is out of the range, the reproduction head is treated as operating abnormally.

(3) The commands are transmitted from the normal operation restoring circuit 10 to the servo circuit, the reproducing circuit, the recording circuit and the head changing circuit 4 to perform the recording operation for the restoration to the normal operation. At this time, the positioning operation is conducted by using a magnetic head (counter magnetic head) positioned on the magnetic disk 2 at the opposite side to the magnetic head 3 having the abnormally-operating reproducing head, so that the magnetic head is moved to an area (free-writing area) on which the recording for normal operation restoring is performed. The free-writing area exists on the innermost periphery of the disk and has a width of 3 times of the track pitch, i.e. 19.1 $\mu$m. Then the recording operation for the restoration to the normal operation is performed.

(4) Thereafter, the retry circuit 11 is actuated, and the recording operation is performed again by the recording head of the magnetic head 3 which has the abnormally-operating reproducing head. After "the recording operation for the restoration to the normal operation" of (3) is completed, the reproducing head operates normally, and thus no data breakdown occurs.

(2) Second Embodiment

This embodiment is obtained by embodying the second mode of the present invention.

The magnetic disk apparatus of this embodiment operates under the following conditions (1) to (4).

(1) The servo pattern is recorded by using a servo track writer under the following condition: rotation speed of 4500 rpm, recording frequency of 6.67 MHz and recording current of 30 $mA_{o-p}$.

(2) The magnetic head 3 comprises an MR/ID composite head (a composite type magnetic head comprising a magneto-resistive effect type reproducing head and an inductive type recording head) which has a recording track width of 5.8 μm and a reproducing track width of 4.4 μm.

(3) The number of sectors per one cylinder of the magnetic disk 2 is equal to 64, and the track pitch is set to 6.35 μm.

(4) In the MR (Magneto-resistive) head which is used as the reproduction head of the magnetic head 3 (MR/ID composite head) in this embodiment, BHN often occurs.

When this reproducing head is applied to the conventional magnetic disk apparatus, the value of the position error signal is varied, and thus it is positioned to an incorrect position in the recording operation, resulting in breakdown of the data.

When the second mode of the present invention shown in FIG. 2 is applied to the magnetic disk apparatus having the above conditions, the inventor of this application has confirmed the following operational effects (1) to (4).

(1) By providing the position error signal generating circuit 12, the eccentricity measuring circuit 13 and the eccentricity judgment circuit 14, and also the recording/reproducing operation control circuit 9 for stopping the recording operation when the disk eccentricity is out of a predetermined range, the breakdown of the data can be prevented.

(2) The disk eccentricity is in a range of 0.35 $\mu m_{p\text{-}p}$ when the reproducing head operates normally. Therefore, when the eccentricity value is out of the range, the reproduction head is treated as operating abnormally.

(3) The commands are transmitted from the normal operation restoring circuit 10 to the servo circuit, the reproducing circuit, the recording circuit and the head changing circuit 4 to perform the recording operation for the restoration to the normal operation. At this time, the positioning operation by using the magnetic head 3 is not performed, but the driving current of a voice coil motor (VCM) is controlled to forcedly push the magnetic head 3 against the innermost periphery of the disk and set this position as an area (free-writing area) for performing the recording operation for the restoration to the normal operation. The width of the free-writing area is set to four times of the track pitch, that is, 25.4 μm. On this free-writing area, the recording operation for the restoration to the normal operation is performed.

(4) Thereafter, the retry circuit 11 is actuated, and the recording operation is performed again by the recording head of the magnetic head 3 which has the abnormally-operating reproducing head. After "the recording operation for the restoration to the normal operation" of (3) is completed, the reproducing head operates normally, and thus no data breakdown occurs.

(3) Third Embodiment

This embodiment is obtained by embodying the third mode of the present invention.

The magnetic disk apparatus of this embodiment operates under the following conditions (1) to (4).

(1) The servo pattern is recorded by using a servo track writer under the following condition: rotation speed of 4500 rpm, recording frequency of 6.67 MHz and recording current of 30 $mA_{o\text{-}p}$.

(2) The magnetic head 3 comprises an MR/ID composite head (a composite type magnetic head comprising a magneto-resistive effect type reproducing head and an inductive type recording head) which has a recording track width of 5.8 μm and a reproducing track width of 4.4 μm.

(3) The number of sectors per one cylinder of the magnetic disk 2 is equal to 64, and the track pitch is set to 6.35 μm.

(4) In the MR (Magneto-resistive) head which is used as the reproduction head of the magnetic head 3 (MR/ID composite head) in this embodiment, BHN and base line shift occur simultaneously. When this reproducing head is applied to the conventional magnetic disk apparatus, the value of the position error signal is varied, and thus it is positioned to an incorrect position in the recording operation, resulting in breakdown of the data.

When the third mode of the present invention shown in FIG. 3 is applied to the magnetic disk apparatus having the above conditions, the inventor of this application has confirmed the following operational effects (1) to (4).

(1) By providing the offset amount storing circuit 15, the offset amount generating circuit 16, the offset amount measuring circuit 17 and the offset variation judgment circuit 18, and also the recording/reproducing operation control circuit 9 for stopping the recording operation when the offset variation is out of a predetermined range, the breakdown of the data can be prevented.

(2) The offset amount is in a range of 2.35 $\mu_{p\text{-}p}$ when the reproducing head operates normally. Therefore, when the offset amount is out of the range, the reproduction head of the magnetic head 3 after the head change is treated as operating abnormally.

(3) The commands are transmitted from the normal operation restoring circuit 10 to the servo circuit, the reproducing circuit, the recording circuit and the head changing circuit 4 to perform the recording operation for the restoration to the normal operation. At this time, as in the case of the second embodiment, the positioning operation by using the magnetic head 3 is not performed, but the driving current of a voice coil motor (VCM) is controlled to forcedly push the magnetic head 3 against the innermost periphery of the disk and set this position as an area (free-writing area) for performing the recording operation for the restoration to the normal operation. The width of the free-writing area is set to four times of the track pitch, that is, 25.4 μm. On this free-writing area, the recording operation for the restoration to the normal operation is performed.

(4) Thereafter, the retry circuit 11 is actuated, and the recording operation is performed again by the recording head of the magnetic head 3 which has the abnormally-operating reproducing head. After "the recording operation for the restoration to the normal operation" of (3) is completed, the reproducing head operates normally, and thus no data breakdown occurs.

(3) Fourth Embodiment

This embodiment is obtained by embodying the fourth mode of the present invention.

The magnetic disk apparatus of this embodiment operates under the following conditions (1) to (4).

(1) The servo pattern is recorded by using a servo track writer under the following condition: rotation speed of 4500 rpm, recording frequency of 6.67 MHz and recording current of 30 $mA_{o\text{-}p}$.

(2) The magnetic head 3 comprises an MR/ID composite head (a composite type magnetic head comprising a magneto-resistive effect type reproducing head and an inductive type recording head) which has a recording track width of 5.8 μm and a reproducing track width of 4.4 μm.

(3) The number of sectors per one cylinder of the magnetic disk is equal to 64, and the track pitch is set to 6.35 μm.

(4) The MR (Magneto-resistive) head which is used as the reproduction head of the magnetic head 3 (MR/ID composite head) in this embodiment operates such that the peak of the reproduced waveform is split or the peak value increases. When this reproducing head is applied to the conventional magnetic disk apparatus, the value of the position error signal is varied, and thus it is positioned to an incorrect position in the recording operation, resulting in breakdown of the data.

When the fourth mode of the present invention shown in FIG. 4 is applied to the magnetic disk apparatus having the above conditions, the inventor of this application has confirmed the following operational effects (1) to (4).

(1) By providing the burst-basis output value detecting circuit 19, the burst output value summing circuit 20 and the burst output total value judgement circuit 21, and also the recording/reproducing operation control circuit 9 for stopping the recording operation when the total value of the signal output values of the respective burst patterns is out of a predetermined value, the breakdown of the data can be prevented.

(2) The output of the burst-basis output value detecting circuit 19 is transmitted to the burst output value summing circuit 20 while converted to a digital value by using a 10-bit A/D converter. When the reproducing head operates normally, the total value of the signal output values of the respective burst patterns is within a digital value range of 2115±96. Therefore, when the total value is out of this range, the reproduction head of the magnetic head 3 is treated as operating abnormally.

(3) The commands are transmitted from the normal operation restoring circuit 10 to the servo circuit, the reproducing circuit, the recording circuit and the head changing circuit 4 to perform the recording operation for the restoration to the normal operation. At this time, as in the case of the second and third embodiments, the positioning operation by using the magnetic head 3 is not performed, but the driving current of a voice coil motor (VCM) is controlled to forcedly push the magnetic head 3 against the innermost periphery of the disk and set this position as an area (free-writing area) for performing the recording operation for the restoration to the normal operation. The width of the free-writing area is set to four times of the track pitch, that is, 25.4 µm. On this free-writing area, the recording operation for the restoration to the normal operation is performed.

(4) Thereafter, the retry circuit 11 is actuated, and the recording operation is performed again by the recording head of the magnetic head 3 which has the abnormally-operating reproducing head. After "the recording operation for the restoration to the normal operation" of (3) is completed, the reproducing head operates normally, and thus no data breakdown occurs.

As described above, in order to detect the abnormality of the operation of the reproducing head due to BHN or the like, the magnetic disk apparatus of the present invention adopts any one of the first to fourth abnormal operation detecting systems, whereby the data can be prevented from being recorded at an incorrect position on the magnetic disk and thus from being broken down.

Further, by using the first or second normal operation restoring system and performing "the recording operation for the restoration to the normal operation" when the reproducing head operates abnormally, the reproducing head can be restored to a normal operation status. Therefore, the reproducing head can be continuously used even when the operation thereof is temporarily abnormal.

What is claimed is:

1. A magnetic disk apparatus which performs a positioning operation in a sector servo system, said magnetic disk apparatus comprising:

a recording/reproducing head which reads an AGC signal stored on a magnetic disk;

an AGC amplifier which amplifies said AGC signal;

an AGC amplifier gain measuring circuit which measures an amplification gain of said AGC amplifier;

an AGC amplifier gain judgment circuit which determines whether the value of said amplification gain is outside of a set range, and outputs a judgment result in response thereto; and a recording/reproducing operation controller which stops a recording operation in a recording circuit when said judgment result indicates that the value of said amplification gain is outside of said set range;

a normal operation restoring circuit which controls said recording/reproducing head to be moved to a predetermined free-writing area in a disk radial direction when said judgment result indicates that the value of said amplification gain is outside of said set range, and then controls said recording/reproducing head to perform a recording operation on the free-writing area; and a retry circuit which moves said recording/reproducing head to a disk radial position which corresponds to a position where said recording/reproducing head was when said judgment result indicated that said value of said amplification gain was outside of said set range, said movement occurring after said recording operation is performed on said free-writing area.

2. The magnetic disk apparatus as claimed in claim 1, wherein the size of said free-writing area is set to at least 2.5 times the track pitch of said magnetic disk.

3. The magnetic disk apparatus as claimed in claim 1, wherein said recording/reproducing head comprises:

an inductive head which records information on said magnetic disk; and a magneto-resistive head which reproduces information on said magnetic disk.

4. A magnetic disk apparatus which performs a positioning operation in a sector servo system said magnetic disk apparatus comprising:

a recording/reproducing head which reads an AGC signal stored on a magnetic disk:

an AGC amplifier which amplifies said AGC signal;

an AGC amplifier gain measuring circuit which measures an amplification gain of said AGC amplifier:

an AGC amplifier gain judgment circuit which determines whether the value of said amplification gain is outside of a set range, and outputs a judgment result in response thereto; and a recording/reproducing operation controller which stops a recording operation in a recording circuit when said judgment result indicates that the value of said amplification gain is outside of said set range;

a normal operation restoring circuit which moves said recording/reproducing head to a free-writing area existing on the innermost periphery of the magnetic disk when said judgment result indicates that the value of said amplification gain is outside of said set range, and then controls said recording/reproducing head to perform a recording operation on said free-writing area; and a retry circuit which moves said recording/reproducing head to a disk radial position which corresponds to a position where said recording/reproducing head was when said judgment result indicated that said value of said amplification gain was outside of said set range, said movement occurring after said recording operation is performed on said free-writing area.

5. The magnetic disk apparatus as claimed in claim 4, wherein the size of said free-writing area is set to at least 2.5 times the track pitch of said magnetic disk.

6. The magnetic disk apparatus as claimed in claim 4, wherein said recording/reproducing head comprises:

an inductive head which records information on said magnetic disk; and a magneto-resistive head which reproduces information on said magnetic disk.

7. A method of controlling a magnetic disk apparatus having a recording/reproducing head, said method comprising:

reading an AGC signal stored on a magnetic disk;
amplifying said signal using an amplifier having a gain;
measuring said gain;
determining whether said gain is within an accepted range; and when said gain is outside of said accepted range:
  stopping said reading;
  moving said recording/reproducing head to a free-writing area; and
  causing said recording/reproducing head to perform a recordation operation.

8. The method as claimed in claim 7 further comprising moving said recording/reproducing head to a disk radial position which corresponds to a position where said recording/reproducing head was when it was determined that said gain was outside of said accepted range.

9. The method as claimed in claim 7 wherein said free-writing area is disposed at ah inner-most periphery of said magnetic disk.

10. The method as claimed in claim 7 wherein the size of said free-writing area is set to at least 2.5 times the track pitch of said magnetic disk.

* * * * *